United States Patent
Huang

(10) Patent No.: US 8,667,048 B2
(45) Date of Patent: Mar. 4, 2014

(54) METHOD FOR MANAGING INTERNET PROTOCOL ADDRESSES IN NETWORK

(75) Inventor: I-Hsiang Huang, Taipei (TW)

(73) Assignee: Tatung Company, Taipei (TW)

(*) Notice: Subject to any disclaimer, the term of this patent is extended or adjusted under 35 U.S.C. 154(b) by 236 days.

(21) Appl. No.: 13/339,356

(22) Filed: Dec. 28, 2011

(65) Prior Publication Data

US 2013/0173685 A1    Jul. 4, 2013

(51) Int. Cl.
*G06F 15/16* (2006.01)

(52) U.S. Cl.
USPC .......................................................... 709/201

(58) Field of Classification Search
USPC ...................... 709/201, 203, 223–226; 718/1; 370/390, 392
See application file for complete search history.

(56) References Cited

U.S. PATENT DOCUMENTS

| | | | |
|---|---|---|---|
| 7,490,324 B2 | 2/2009 | Shultz et al. | |
| 8,549,187 B1* | 10/2013 | Christopher et al. | 710/9 |
| 2004/0052216 A1 | 3/2004 | Roh | |
| 2007/0073882 A1* | 3/2007 | Brown et al. | 709/226 |
| 2008/0201709 A1* | 8/2008 | Hodges | 718/1 |
| 2008/0250407 A1* | 10/2008 | Dadhia et al. | 718/1 |
| 2010/0205304 A1* | 8/2010 | Chaturvedi et al. | 709/226 |

* cited by examiner

*Primary Examiner* — Wing F Chan
*Assistant Examiner* — Hitesh Patel
(74) *Attorney, Agent, or Firm* — Jianq Chyun IP Office

(57) ABSTRACT

A method for managing Internet protocol (IP) addresses in a network is provided. IP addresses are assigned to a plurality of virtual machines of servers in the network according to media access control (MAC) addresses of the virtual machines, and IP addresses are assigned to the servers according to MAC addresses of the servers. An active server and the virtual machines thereof respectively record the assigned IP addresses thereof in a recording unit. Then, the assigned IP addresses recorded by the recording unit are transmitted to a storage module in the network. Accordingly, the IP addresses assigned to the servers and the virtual machines could be handled properly in the network, and the servers and the virtual machines could be remotely controlled according to the IP addresses recorded in the storage module.

8 Claims, 4 Drawing Sheets though the MAC addresses of the virtual machines are the same. Accordingly, the control module 22 cannot remotely control the operations of the servers 30 and the virtual machines 32 according to the IP addresses of the servers 30 and the virtual machines 32.

US 8,667,048 B2

METHOD FOR MANAGING INTERNET PROTOCOL ADDRESSES IN NETWORK

BACKGROUND OF THE INVENTION

1. Field of the Invention

The invention relates to a method for managing Internet protocol (IP) addresses in a network. Particularly, the invention relates to a method for managing IP addresses of servers and virtual machines in a network.

2. Description of Related Art

Please refer to FIG. 1. FIG. 1 is a functional block diagram of a director center 20 and a plurality of servers 30 in a network 10 according to the related art. The director center 20 controls operations of the plurality of the servers 30. Moreover, each of the servers 30 executes one or more of virtual machines 32, and each of the virtual machines 32 is used for providing specific network service. The director center 20 further includes a dynamic host configuration protocol (DHCP) server 24 for assigning the Internet protocol (IP) addresses to the servers 30 and the virtual machines 32 according to the media access control (MAC) addresses of the servers 30 and the virtual machines 32.

All of the virtual machines 32 are established by the servers 30 based on a system image 26. When one of the servers 30 is turned on, the turned-on server 30 loads the system image 26 and establishes the virtual machine(s) 32 thereof based on the same system image 26. Since all of the virtual machines 32 are established according to the same system image 26, the MAC addresses of the virtual machines 32 would be identical to each other at the beginning of establishing the virtual machines 32. As a result, the control module 22 cannot be sure of the assigned IP addresses of the virtual machines 32 since the MAC addresses of the virtual machines are the same. Accordingly, the control module 22 cannot remotely control the operations of the servers 30 and the virtual machines 32 according to the IP addresses of the servers 30 and the virtual machines 32.

SUMMARY OF THE INVENTION

The invention is directed to a method for managing Internet protocol (IP) addresses in a network. The IP addresses assigned to a plurality of servers and virtual machines would be recorded and used for remotely controlling the servers and the virtual machines.

The invention provides a method for managing IP addresses in a network. The method comprising steps of: (a) driving at least one active server of servers and at least one virtual machine of the active server respectively to log in a shared resource in the network, wherein the servers and a plurality of virtual machines of the servers have different assigned IP addresses; (b) looking for a recording unit of the shared resource according to a first mark of the active server; (c) a granted processing unit obtaining access right of the recording unit, wherein the granted processing unit is a component of a group consisting of the active server and the at least one virtual machine of the active server; (d) the granted processing unit recording the assigned IP address thereof in the recording unit, and restricting others of the group except the granted processing unit from accessing the recording unit; (e) determining whether all of the assigned IP addresses of the active server and the at least one virtual machine of the group have been recorded in the recording unit, and releasing the access right of the recording unit; (f) if not all of the assigned IP addresses of the active server and the at least one virtual machine of the group have been recorded in the recording unit, a new granted processing unit of the group obtaining the access right of the recording unit, and repeating the steps (d) and (e); and (g) if all of the assigned IP addresses of the active server and the at least one virtual machine of the group have been recorded in the recording unit, transmitting the assigned IP addresses recorded in the recording unit to a storage module in the network.

In an embodiment of the invention, each of the servers loads a system image, and all of the virtual machines are established based on the system image. The method further comprises modifying the MAC addresses of the virtual machines before the IP addresses are assigned to the virtual machines.

In an embodiment of the invention, the first mark is a media access control (MAC) of the active server.

In an embodiment of the invention, the shared resource is a director center of the network.

In an embodiment of the invention, the shared resource is a shared folder in the network.

In an embodiment of the invention, the recording unit is a file corresponding to the active server.

In an embodiment of the invention, the storage module is a database for storing the assigned IP addresses of the active server and the virtual machines of the group.

In an embodiment of the invention, the assigned IP addresses of the servers and the virtual machines are different from each other.

According to the above descriptions, the invention provides a method for managing IP addresses in a network. The IP addresses assigned to a plurality of servers and virtual machines would be recorded and used for remotely controlling the servers and the virtual machines.

In order to make the aforementioned and other objects, features and advantages of the present invention comprehensible, several preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
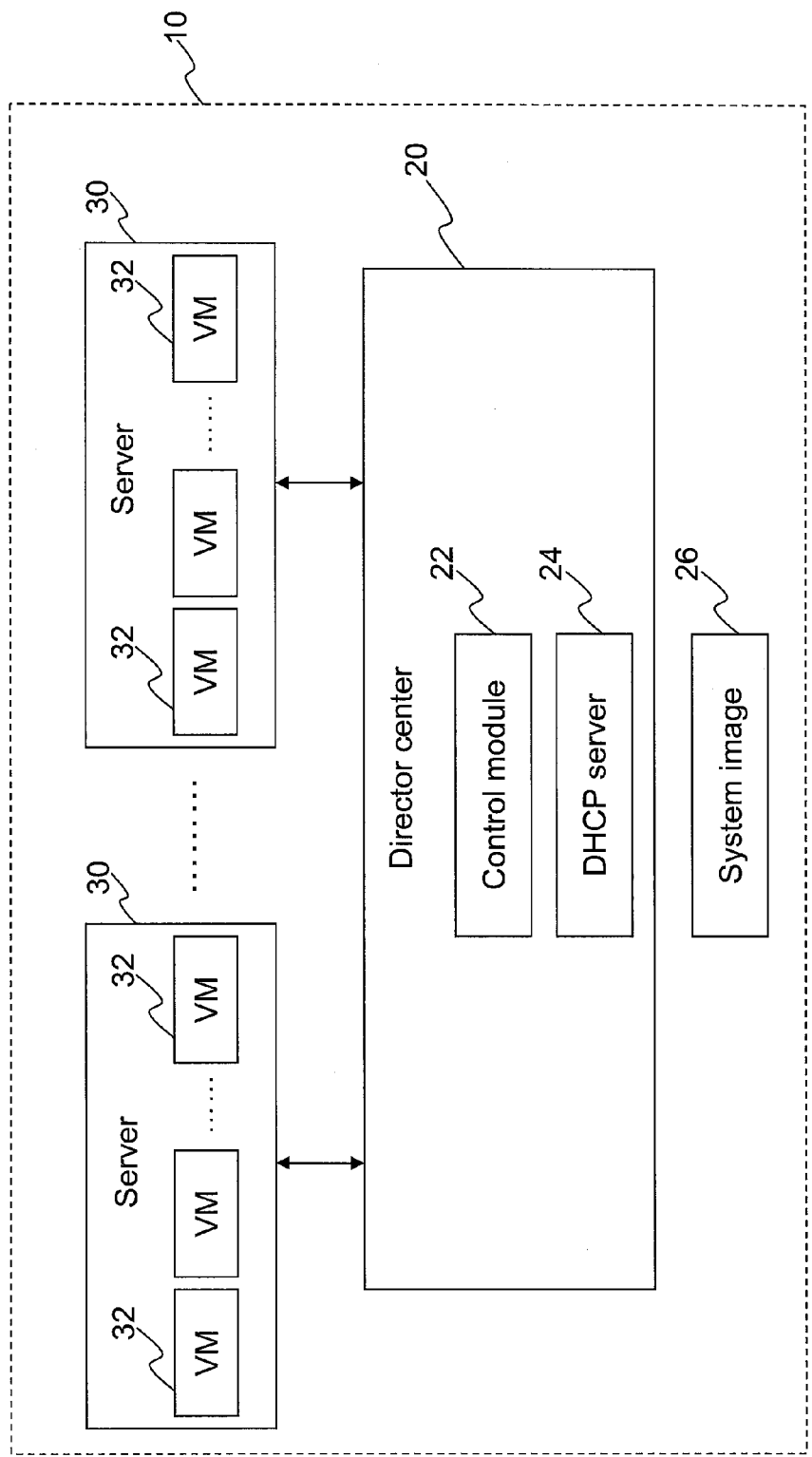
FIG. 1 is a functional block diagram of a director center and a plurality of servers in a network according to the related art.
Figure 2:
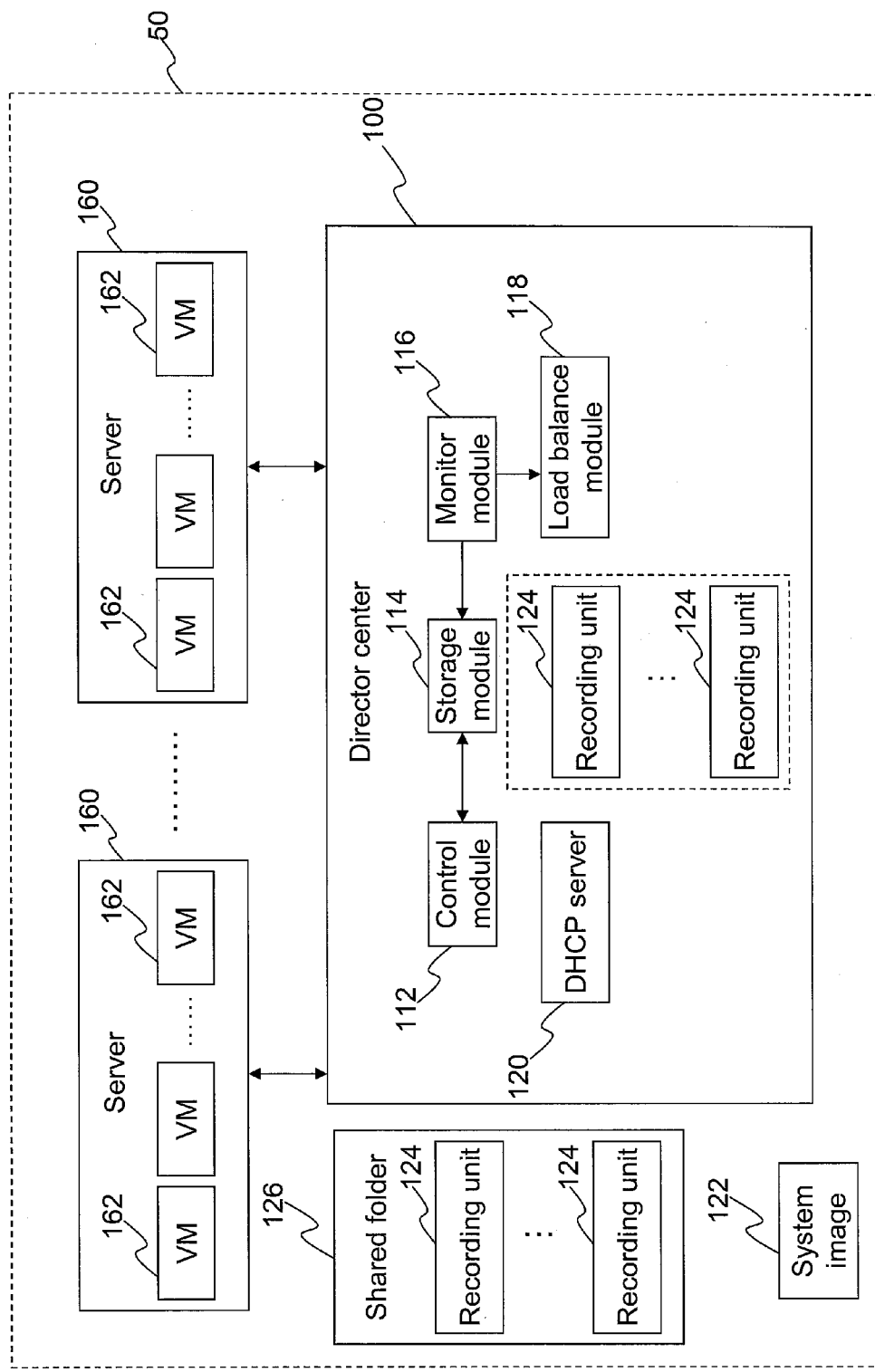
FIG. 2 is a functional block diagram of a director center and a plurality of servers in a network according to an embodiment of the invention.

Please refer to FIG. 2. FIG. 2 is a functional block diagram of a director center 100 and a plurality of servers 160 in a network 50 according to an embodiment of the invention. The director center 100 can control operations of the plurality of the servers 160. Each of the servers 160 is used for providing a specific network service, for example, file sharing, webpage accessing, online game, etc. Moreover, in order to improve energy utilization efficiency of the servers 160, in another embodiment of the invention, each of the servers 160 can execute one or more of virtual machines 162, and each of the virtual machines 162 is used for providing the aforementioned specific network service. Furthermore, in order to efficiently use network addresses, the director center 100 further includes a dynamic host configuration protocol (DHCP) server 120 for assigning the Internet protocol (IP) addresses to the servers 160 and the virtual machines 162. Generally, the IP addresses used by the servers 160 and the virtual machines 162 are different to each other.

In an embodiment of the invention, all of the servers 160 are diskless servers. In other words, each of the servers 160 does not have any hard disk to store an operating system (OS) which could be executed by the servers 160 to handle the operations of the servers 160. Accordingly, in the embodiment, all of the servers 160 loads a system image 122 in the network 50, and all of the virtual machines 162 are established by the servers 160 based on the system image 122. When one of the servers 160 is turned on, the turned-on server loads the system image 122 and establishes the virtual machine(s) 162 thereof based on the same system image 122. The operating environment of each server 160 is also established based on the system image 122. Since all of the virtual machines 162 are established according to the same system image 122, the media access control (MAC) addresses of the virtual machines 162 would be identical to each other at the beginning of establishing the virtual machines 162. Therefore, the servers 160 would modify the MAC addresses of the virtual machines 162. As a result, the MAC addresses of the servers 160 and the modified MAC addresses of the virtual machines 162 would be different from each other.

The DHCP server 120 assigns IP addresses to the servers 160 according to the MAC addresses of the servers 160. Similarly, the DHCP server 120 assigns IP addresses to the virtual machines 162 according to the modified MAC addresses of the virtual machines 162. Since the MAC addresses of the servers 160 and the modified MAC addresses of the virtual machines 162 are different from each other, the assigned IP addresses of the servers 160 and the virtual machines 162 would be different from each other.

In an embodiment of the invention, the director center 100 further has a storage module 114 and a control module 112. The control module 112 cooperates with various components of the director center 100. The storage module 114 is used for storing data and could be a database, a memory space or the like. The data stored in the storage module 114, for example, includes historic records of network service demands within various service periods, states of the servers 160 and the virtual machines 162, or specifications of the servers 160, etc. The system image 122 could be stored in the storage module 114 or stored in other storage device which operates independently from the storage module 114 in the network 50.

In an embodiment of the invention, the servers 160 have hard disks to store the system images 122. The virtual machines 162 and the operating environments of the servers 160 are established according to different system images 122, and the initial MAC addresses of the servers 160 and the virtual machines 162 are different from each other. Therefore, it is unnecessary to modify the MAC addresses of the virtual machines 162. When the servers 160 and the virtual machines 162 are turned on or established, the DHCP server 120 assigns the IP addresses to the servers 160 according to the MAC addresses of the servers 160 and assigns the IP addresses to the virtual machines 162 according to the initial MAC addresses of the virtual machines 162.

In an embodiment of the invention, the director center 100 further includes a load balance module 118 and a monitor module 116. The load balance module 118 is used for guiding and distributing network service demands from clients to the servers 160 and the virtual machines 162 according to computing capability of each of the servers 160 and the virtual machines 162. The monitor module 116 is used for monitoring each of the servers 160 and the virtual machines 162, reporting state variations of the servers 160 and the virtual machines 162 to the load balance module 118 when the states of the servers 160 and the virtual machines 162 are varied, and updating the data in the storage module 114, so that the data related to the states of the servers 160 and the virtual machines 162 in the storage module 114 can be opportunely updated. In an embodiment of the invention, the load balance module 118 is, for example, a virtual server in a Linux operating system.

In the embodiment, the servers 160 and the virtual machines 162 are classified into different groups, and each of the group comprises one of the servers 160 and the virtual machine(s) 162 established by the corresponding server 160. Moreover, each of the groups corresponds to one of recording units 124 of the director center 100, and each of the recording units 124 could be a file which is named according to the MAC address of the server 160 of the corresponding group. In an embodiment of the invention, the recording units 124 could be stored in the storage module 114 or stored in other storage device which operates independently from the storage module 114.

When one of the servers 160 is active, the active server 160 and at least one virtual machine 162 of the active server 160 obtain the assigned IP addresses from the DHCP server 120. After obtaining the IP addresses from the DHCP server 120, the active server 160 and the at least one virtual machine 162 of the active server 160 are respectively driven to log in a shared resource in the network 50. In an embodiment of the invention, the shared resource is the director center 100. In an embodiment of the invention, the shared resource is a shared folder 126 of the network 50, and the recording units 124 could be stored in the shared folder 126.

After the active server 160 or the virtual machine 162 logs in the shared resource, the active server 160 or the virtual machine 162 looks for the corresponding recording unit 124 according to a first mark of the active server 160. In an embodiment, the first mark is the MAC address of the active server 160. Since the corresponding recording unit 124 is named according to the MAC address of the active server, the active server 160 or the virtual machine 162 could look for the corresponding recording unit 124 according to the MAC address of the active server 160. However, if the corresponding recording unit 124 is not found, the active server 160 or the virtual machine 162 would establish the corresponding recording unit 124 automatically.

Figure 3:
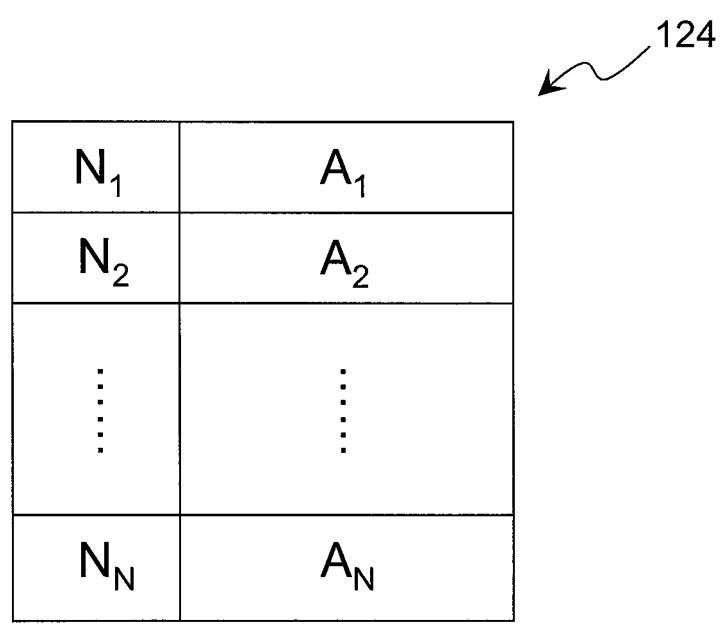
FIG. 3 is a diagram illustrating the data structure of a recording unit according to an embodiment of the invention.

After the corresponding recording unit 124 is found or established, the assigned IP addresses of the active server 160 and the virtual machine(s) 162 of the active server 160 would be respectively recorded in the corresponding recording unit 124. Please refer to FIG. 3. FIG. 3 is a diagram illustrating the data structure of the recording unit 124 according to an embodiment of the invention. The recording unit 124 is used to recording a plurality of second marks $N_1$-$N_N$ and the assigned IP addresses $A_1$-$A_N$. In the embodiment, each of the second marks $N_1$-$N_N$ corresponds to the active server 160 or one of the virtual machine(s) 162 of the active server 160. In an embodiment of the invention, one of the second marks $N_1$-$N_N$ could be null and corresponds to the assigned IP address of the active server 160, and the rest of the second marks $N_1$-$N_N$ correspond to the assigned IP addresses of the virtual machine(s) 162 of the active server 160. In an embodiment of the invention, all of the second marks $N_1$-$N_N$ correspond to the virtual machine(s) 162 of the active server 160, and the assigned IP address of the active server 160 is recorded in somewhere of the recording unit 124.

In the embodiment, the second marks $N_1$-$N_N$ are recorded in the recording unit 124 when the recording unit 124 is established. In an embodiment of the invention, each of the second marks $N_1$-$N_N$ and its corresponding one assigned IP addresses are simultaneously recorded in the recording unit 124 by the active server 160 or the corresponding one virtual machine 162 which obtains the access right of the recording unit 124.

In an embodiment of the invention, the IP address $A_1$ is the assigned IP address of the active server 160, and the IP addresses $A_2$-$A_N$ are the assigned IP addresses of the virtual machines of the active server 160. Moreover, the second mark $N_1$ corresponds to the active server 160, and each of the second marks $N_2$-$N_N$ corresponds to one of the virtual machine(s) 162 of the active server 160. Accordingly, each of the assigned IP addresses $A_1$-$A_N$ would be recorded in a proper location of the recording unit 124 according to the second marks $N_1$-$N_N$. However, the invention is not limited thereto. For example, in an embodiment of the invention, the sequence of the second marks $N_1$-$N_N$ in the recording unit 124 could be random, and the IP addresses $A_1$-$A_N$ are recorded in the recording unit 124 based on the second marks $N_1$-$N_N$.

Before each of the assigned IP addresses $A_1$ to $A_N$ is recorded in the recording unit 124, the active server 160 and the virtual machine(s) 162 of the active server 160 obtain the access right of the recording unit 124 one by one to record the assigned IP address thereof in the recording unit 124. The active server 160 or the virtual machine 162 that owns the access right of the recording unit 124 is regarded as a "granted processing unit". The granted processing unit records the assigned IP address thereof in the recording unit 124 when the granted processing unit logs in the shared resource. And meanwhile, others of the group except the granted processing unit are restricted from accessing the recording unit 124. In other words, the granted processing unit in the group consisting of the active server 160 and the virtual machine(s) 162 of the active server 160 obtains the access right of the recording unit 124 to record the assigned IP address thereof in the recording unit 124. Any of the active server 160 without the access right and the virtual machine(s) 162 without the access right is restricted from accessing the recording unit 124. When the granted processing unit finishes recording the assigned IP address thereof in the recording unit 124, the access right of the recording unit 124 is released. Accordingly, the access right of the recording unit 124 could be obtained by a new granted processing unit, and the new granted processing unit would record the assigned IP address thereof in the recording unit 124.

After any of the assigned IP addresses is recorded in the recording unit 124, the granted processing unit determines whether all of the assigned IP addresses of the group are recorded in the recording unit 124 and releases the access right of the recording unit 124. If the granted processing unit determines that not all of the assigned IP addresses of the group are recorded in the recording unit 124, the access right of the recording unit 124 would be obtained by the new granted processing unit of the same group, and the new granted processing unit would record the assigned IP address thereof in the recording unit 124. Accordingly, the assigned IP addresses corresponding to the group would be sequentially recorded in the recording unit 124.

Figure 4:
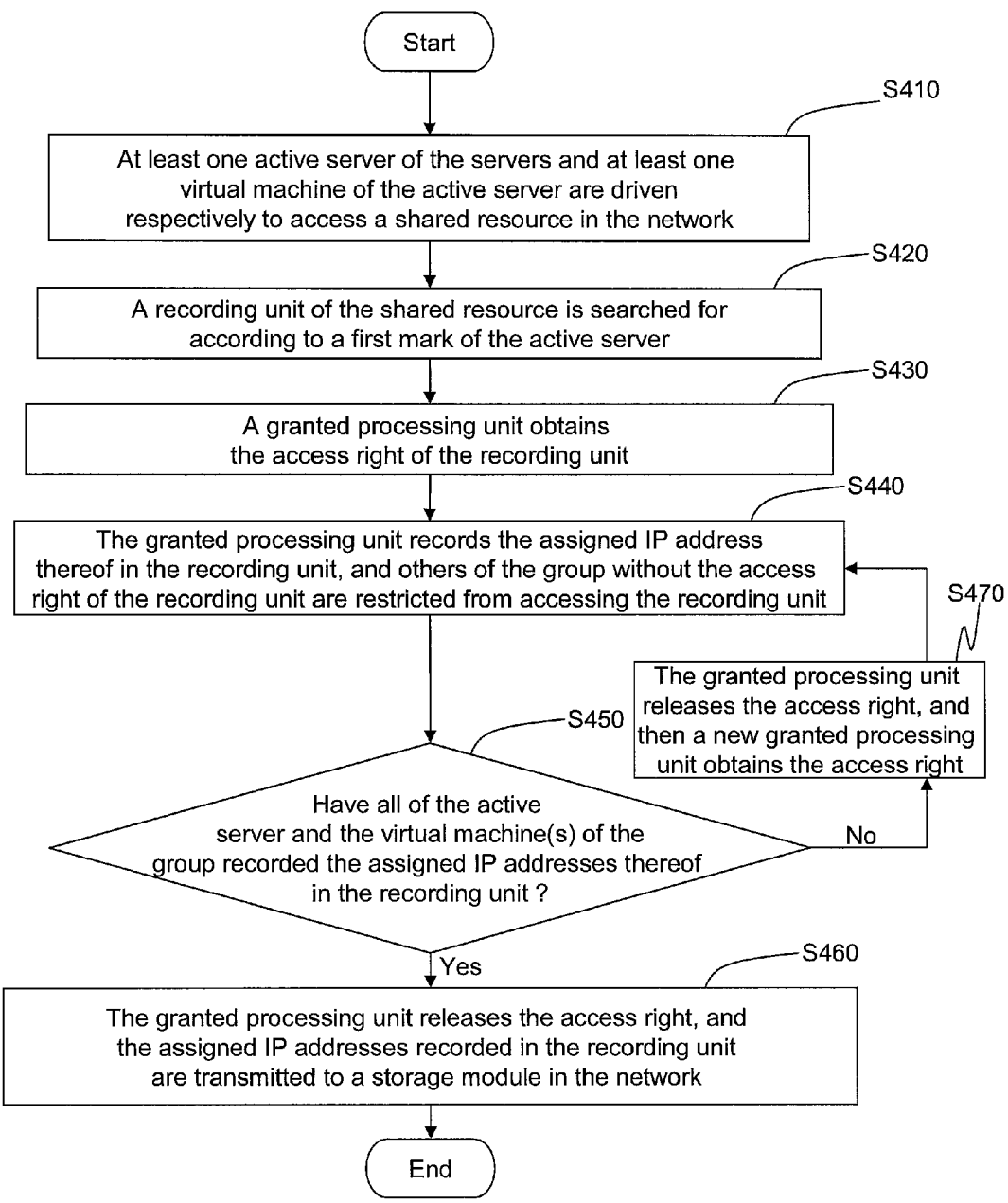
FIG. 4 is a flow chart of a method for managing the IP addresses in the network according to an embodiment of the invention.

Please refer to FIG. 4. FIG. 4 is a flow chart of a method for managing IP addresses in the network 50 according to an embodiment of the invention. In step S410, at least one active server 160 and at least one virtual machine 162 of the active server 160 are driven to respectively log in the shared resource in the network 50. The shared resource could be the director center 100 or the shared folder 126. In step S420, the recording unit 124 corresponding to the active server would be found according to a first mark of the active server 160. The first mark could be the MAC address of the active server 160. In step S430, the granted processing unit in the group consisting of the active server 160 and the virtual machine(s) of the active server 160 obtains the access right of the recording unit 124. In step S440, the granted processing unit records the assigned IP address thereof in the recording unit 124 when logging in the shared resource, and others of the group without the access right of the recording unit 124 (i.e. except the granted processing unit) are restricted from accessing the recording unit 124. In step S450, the granted processing unit determines whether all of the active server 160 and the virtual machine(s) 162 of the group have recorded the assigned IP addresses thereof in the recording unit 124. If not all of the assigned IP addresses of the group have been recorded in recording unit 124, the granted processing unit releases the access right of the recording unit 124 and a new granted processing unit of the group obtains the released access right of the recording unit 124 (step S470), and then the steps S440 and S450 would be repeated. Otherwise, step S460 would be performed, such that the granted processing unit releases the access right of the recording unit 124 and transmits the assigned IP addresses recorded in the recording unit 124 to the storage module 114, and the storage module 114 stores the assigned IP addresses.

In an embodiment of the invention, each of the servers 160 loads the system image 122, and all of the virtual machines 162 are established based on the system image 162. In the embodiment, the method further comprises modifying the MAC addresses of the virtual machines before the IP addresses are assigned to the virtual machines 162.

Since the DHCP server 120 dynamically assigns the IP addresses to the servers 160 and the virtual machines 162, the assigned IP address of the same server 160 or virtual machine 162 would be changed after the server 160 or the virtual machine 162 reboots or re-established. However, when the server 160 or the virtual machine 162 reboots or re-established, the server 160 or the virtual machine 162 would also record the new IP address thereof in the corresponding recording unit 124. Then, the updated IP address in the corresponding recording unit 124 is transmitted to the storage module 114, such that the IP addresses recorded in the storage module 114 could be updated timely and used to remotely control the servers 160 and the virtual machines 160.

In summary, the invention provides a method for managing IP addresses in a network. The IP addresses assigned to a plurality of servers and virtual machines would be recorded and used for remotely controlling the servers and the virtual machines.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for managing Internet protocol (IP) addresses in a network, the method comprising steps of:
    (a) driving at least one active server of servers and at least one virtual machine of the active server respectively to log in a shared resource in the network, wherein the servers and a plurality of virtual machines of the servers have different assigned IP addresses;
    (b) looking for a recording unit of the shared resource according to a first mark of the active server;
    (c) a granted processing unit obtaining access right of the recording unit, wherein the granted processing unit is a component of a group consisting of the active server and the at least one virtual machine of the active server;
    (d) the granted processing unit recording the assigned IP address thereof in the recording unit, and restricting others of the group except the granted processing unit from accessing the recording unit;
    (e) determining whether all of the assigned IP addresses of the active server and the at least one virtual machine of the group have been recorded in the recording unit, and releasing the access right of the recording unit;
    (f) if not all of the assigned IP addresses of the active server and the at least one virtual machine of the group have been recorded in the recording unit, a new granted processing unit of the group obtaining the access right of the recording unit, and repeating the steps (d) and (e); and
    (g) if all of the assigned IP addresses of the active server and the at least one virtual machine of the group have been recorded in the recording unit, transmitting the assigned IP addresses recorded in the recording unit to a storage module in the network.

2. The method as claimed in claim 1, wherein each of the servers loads a system image, all of the virtual machines are established based on the system image, and the method further comprises:
    modifying the MAC addresses of the virtual machines before the IP addresses are assigned to the virtual machines.

3. The method as claimed in claim 1, wherein the first mark is a media access control (MAC) address of the active server.

4. The method as claimed in claim 1, wherein the shared resource is a director center of the network.

5. The method as claimed in claim 1, wherein the shared resource is a shared folder in the network.

6. The method as claimed in claim 1, wherein the recording unit is a file corresponding to the active server.

7. The method as claimed in claim 1, wherein the storage module is a database for storing the assigned IP addresses of the active server and the virtual machines of the group.

8. The method as claimed in claim 1, wherein the assigned IP addresses of the servers and the virtual machines are different from each other.

* * * * *